Figure 1:
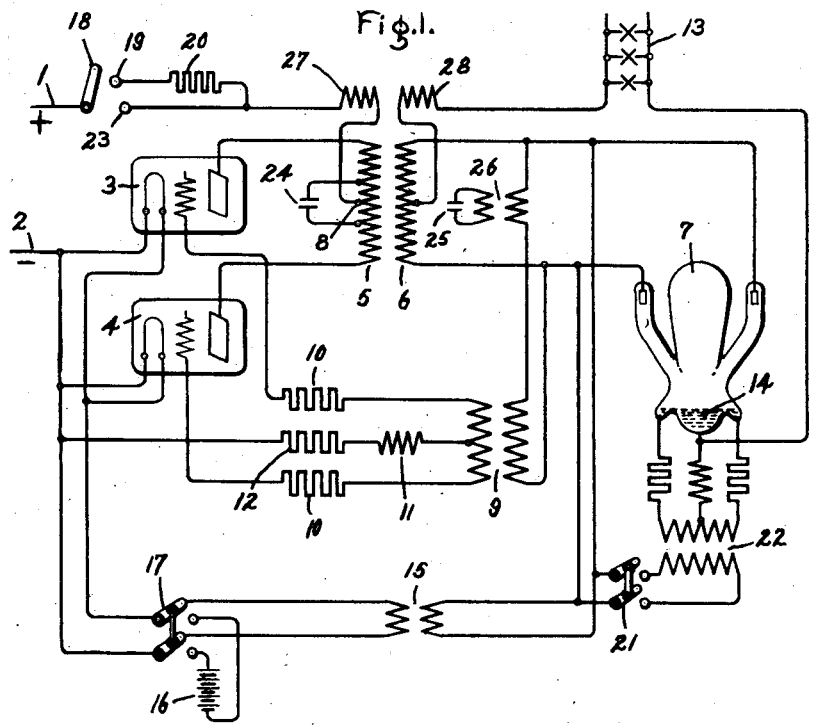

April 7, 1931.    E. F. W. ALEXANDERSON    1,800,002
SYSTEM OF DISTRIBUTION
Filed July 13, 1923    2 Sheets—Sheet 1

Inventor:
Ernst F. W. Alexanderson,
by  *Alexander F. Smith*
His Attorney.

April 7, 1931.  E. F. W. ALEXANDERSON  1,800,002
SYSTEM OF DISTRIBUTION
Filed July 13, 1923   2 Sheets-Sheet 2

Inventor:
Ernst F.W. Alexanderson,
by
His Attorney.

Patented Apr. 7, 1931

1,800,002

UNITED STATES PATENT OFFICE

ERNST F. W. ALEXANDERSON, OF SCHENECTADY, NEW YORK, ASSIGNOR TO GENERAL ELECTRIC COMPANY, A CORPORATION OF NEW YORK

SYSTEM OF DISTRIBUTION

Application filed July 13, 1923. Serial No. 651,409.

My present invention relates to systems of electrical distribution in which it is desired to change direct current of one voltage to direct current of another voltage.

In systems involving the transmission of large amounts of electrical energy for considerable distances it has become customary to employ high voltage alternating currents. One of the advantages of such a system which renders it peculiarly suitable for electrical power distribution is the comparative simplicity of the apparatus required for transforming the low voltage current generated to high voltage for transmission and in turn transforming the high voltage current transmitted to a low voltage suitable for utilization.

It has long been recognized that a high voltage direct current transmission system would have certain advantages over an alternating current system but it has not been possible fully to realize these advantages because of the impossibility of directly generating the high voltage desired and the lack of suitable apparatus for efficiently converting the transmitting high voltage direct current to a voltage suitable for utilization.

The particular portion of this converting operation which has presented the greatest difficulties is that of changing a direct current of one voltage to an alternating current of another voltage.

One of the objects of my invention is to provide a simple and efficient apparatus which is capable of converting a direct current of any voltage into alternating current of any other desired voltage.

It is another object of my invention to provide an improved electric power converting apparatus, including a vapor electric discharge device, for converting direct current into alternating current in which there is a complete absence of moving parts or contacts.

It has also been proposed to convert low voltage direct current to alternating current by means of electron discharge devices or thermionic valves, transform the alternating current to a high voltage, rectify the high voltage alternating current by thermionic rectifiers, transmit the rectified high voltage current to a distant point, there convert it to high voltage alternating current by the thermionic valve and transform the high voltage alternating current to low voltage alternating current for direct utilization or for rectification to produce direct current of a desired voltage.

A further object of my invention is to provide apparatus whereby one or more of the steps referred to in the system described may be carried out more efficiently than has heretofore been possible.

In order that a valve of the thermionic type may work at the best efficiency it is desirable that during the periods when current is permitted to flow the value of the current should quickly build up from zero to a maximum desired value, remain at that value during the greater portion of the period and then quickly die down to zero. In other words, the current impulses through the valve should be of substantially rectangular wave form. Where a valve is employed for converting direct current to alternating which is to be transmitted or utilized in ordinary alternating current apparatus, means should be provided for converting these current waves of rectangular form to sine wave form. On the other hand if the alternating current produced is to be immediately transformed in voltage and rectified there is no necessity for changing the wave form but on the contrary a smoother direct current may be obtained if current impulses of rectangular wave form are supplied to the rectifier than when sine waves are supplied.

Still another object of my invention is to provide an apparatus whereby alternating current impulses of substantially rectangular wave form may be supplied to a rectifier which is employed in the process of converting direct current from one voltage to another.

The novel features which I believe to be characteristic of my invention are set forth with particularity in the appended claims. My invention itself, however, both as to its organization and method of operation together with further objects and advantages thereof will best be understood by reference to the following description taken in connection with the accompanying drawing in which Figs. 1 to 3 inclusive, show diagrammatically three different circuit connections whereby my invention may be carried into effect.

I have indicated in Fig. 1 a system in which direct current from the mains 1 and 2 is supplied through the plate circuits of the thermionic valves 3 and 4 to the primary winding 5 of a transformer having a secondary winding 6 the opposite terminals of which are connected to the anodes of a mercury rectifier 7. Direct current main 1 is connected to the middle point 8 of winding 5 and main 2 is connected to the cathodes of the valves so that current impulses supplied to the winding 5 by the two valves flow in opposite directions through winding 5.

The valves are controlled in the desired manner by means of voltages applied to their grids which are supplied from the secondary winding 6. The connections for this purpose include a transformer 9 the primary of which is connected across the terminals of winding 6. The terminals of the secondary of transformer 9 are connected to the grids of valves 3 and 4 through resistances 10 and the mid point of the secondary of transformer 9 is connected to the cathodes of valves 3 and 4 through a reactance 11 and a resistance 12.

A load circuit to which the rectified current from rectifier 7 is supplied is connected from the middle point of secondary winding 6 through the load devices 13 of any suitable character to the cathode 14 of rectifier 7. Current for heating the cathodes of valves 3 and 4 may be supplied by means of a transformer 15 the primary of which is connected to the terminals of secondary winding 6.

In starting the operation of the system described current may first be supplied to the cathodes of valves 3 and 4 from a battery 16 by means of the switch 17. Direct current may then be supplied to the valves by means of the switch 18 which is first closed upon contact 19 in order that resistance 20 may be included in series with the direct current supply to prevent the building up of abnormally high voltages in the main transformer. The rectifier 7 may then be started by supplying the necessary starting voltage to the starting electrodes through the switch 21 and transformer 22. As soon as the apparatus has begun to operate switch 18 may be thrown to contact 23 to disconnect resistance 20, switch 17 may be thrown to the position indicated to disconnect battery 16 and switch 21 opened.

The frequency of the oscillations produced may be determined by means of a condenser 24 which is connected across a portion or a total of the primary winding 5. In the operation of a system of the type described it is necessary for the efficient and satisfactory operation that current should be allowed to start in one valve before it is completely interrupted in the other valve. This requires that the positive voltages supplied to the grids of the valves should lead the voltages induced in the secondary 6. The desired lead in voltage may be secured by including a condenser in circuit with the primary of transformer 9. In the arrangement shown in Fig. 1 this condenser 25 is connected to the circuit through a transformer 26 for the purpose of stepping down the current and thus permitting the use of a smaller condenser.

In order to secure the most satisfactory operation of a system of the type here involved it is necessary that the momentary fluctuation in the direct current supplied during the periods when the current is being transferred from one valve to another should be prevented. This may be accomplished by inserting a reactance in series with the direct current supply which absorbs the difference of potential between the direct current supply source and the voltage across the transformer winding plus the drop in the valve. This reactance for low frequency use would have to be of the iron core type and if subjected to direct current saturation would have to be unduly large. It is also desirable to employ a reactance in the output circuit which reactance also, if subject to direct current saturation, would have to be large. It is possible, however, by combining these reactances 27 and 28 on a single core to greatly reduce the size required. The two reactances are so wound that the direct current components of the two currents flowing neutralize each other and these current components have no saturating effect upon the core.

The system which I have described is especially adapted for transforming high voltage direct current to direct current at a lower voltage, but may equally well be employed for producing the opposite result. It will be of course understood that the types of valve and rectifier indicated are purely illustrative and that other equivalent types may equally well be employed. The ratio between the voltage of the direct current supplied and the voltage supplied to the load will be substantially equal to the ratio of the turns in the primary winding 5 to the turns in the secondary winding 6. I have found that with a system such as I have described, substantially rectangular wave form current impulses may be supplied to the primary winding which will result in supplying similar wave form impulses to the rectifier. The controlling potentials supplied to the grids of the valves will also be of substantially rectangular wave form which insures the most efficient operation of the valves. I have used the expression "substantially rectangular wave form" in this specification and in the claims that follow not in its strict geometrical sense but to describe a wave which builds up to its maximum value and dies down much more rapidly than a sine wave and has what is commonly known as a flat top.

While there is an alternating potential developed across the terminals of secondary 6, the main transfer of energy is accomplished by means of current which flows only in one direction every other half wave and each half of the secondary winding carries current in only one direction every other half wave, the currents in one-half of the secondary being magnetically in opposite direction to the currents in one-half of the primary winding during the positive half cycle whereas during the negative half cycle these halves of the primary and secondary windings carry no appreciable current. The magnetic balance of the transformer is established by opposing effects of two direct currents, the currents in the primary and secondary being inversely proportional to the number of turns in these windings.

Figure 2:
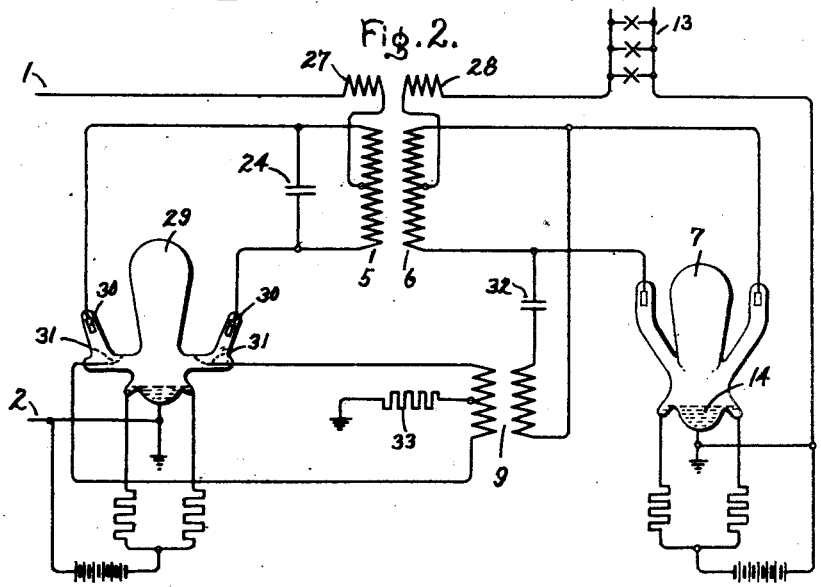

The system shown in Fig. 2 differs chiefly from that of Fig. 1 in that a mercury vapor valve 29 is substituted for the thermionic valves 3 and 4. This valve, in addition to the usual anodes 30 is provided with auxiliary electrodes 31 which serve a function analogous to that of the grids of thermionic valves. The precise form of potential wave applied to the auxiliary electrodes 31 in this case is not of the same importance as in the case of thermionic valves. As soon as current has begun to flow to one of the anodes 30 the potential applied to the corresponding electrode 31 has substantially no effect on the current. The control requirements in this case are that the potential of the electrode 31 should be made positive to permit current to start to the corresponding anode shortly before the current to the other anode has fallen to zero and the potential of the auxiliary electrode should be made negative at the instant the current to the corresponding anode has fallen to zero to prevent the current to that anode from immediately starting again. These requirements may be fulfilled by the exciting arrangement for the auxiliary electrodes shown, the necessary lead in the positive potentials impressed upon the electrodes 31 being obtained by means of the condenser 32 which in this case is in series with the primary winding of transformer 9. The regulating reactance 11 of the system shown in Fig. 1 may in this case be omitted. The control circuits should, however, include a resistance 33 for limiting the current which can flow to the auxiliary electrodes.

However, in this arrangement, the condenser 24 has a function somewhat different from that which it has in the arrangement shown in Fig. 1. Since the grids 31 of the vapor electric device 29 are incapable of interrupting the current flowing to the anodes 30 of this device after the current has once been started, it is important that some means be provided for successively interrupting the current flowing to the two anodes 30 in order to properly transfer the load current between the two anodes. This commutation of the load current between the two anodes of the device 29 is accomplished by the condenser 24 as follows: Assume for example, that the left hand grid 31 is initially positive so as to render the vapor path to the left hand anode 30 conducting. Current will now flow from the upper direct current terminal through the upper half of the transformer winding 5 and the left hand vapor path of the device 29. As the current builds up in the inductive winding 5, a still more positive potential will be induced at the lower terminal of this winding and the condenser 24 will become charged to a potential which is nearly twice that of the direct current circuit. At the next instant when the grid polarity is reversed and the vapor path to the right hand anode 30 is made conducting, it will be seen that the condenser 24 is short circuited through the left and right hand vapor paths of the device 29 thus making the cathode positive with respect to the left hand anode 30 and instantly interrupting the current in this path due to the unilateral conductive characteristics of the device 29. At the end of the next half cycle when the grid polarity is again reversed, the condenser 24 will similarly commutate the current from the right hand anode 30 to the left hand anode 30 and this operation will be repeated indefinitely. In the arrangement just described, the condenser 24 is preferably not tuned with the transformer winding 5 but functions only to furnish the energy necessary for the commutation just described. The frequency of the alternating current delivered by this apparatus is dependent primarily on the constants of the grid circuit comprising condenser 32 and grid transformer 9.

Figure 3:
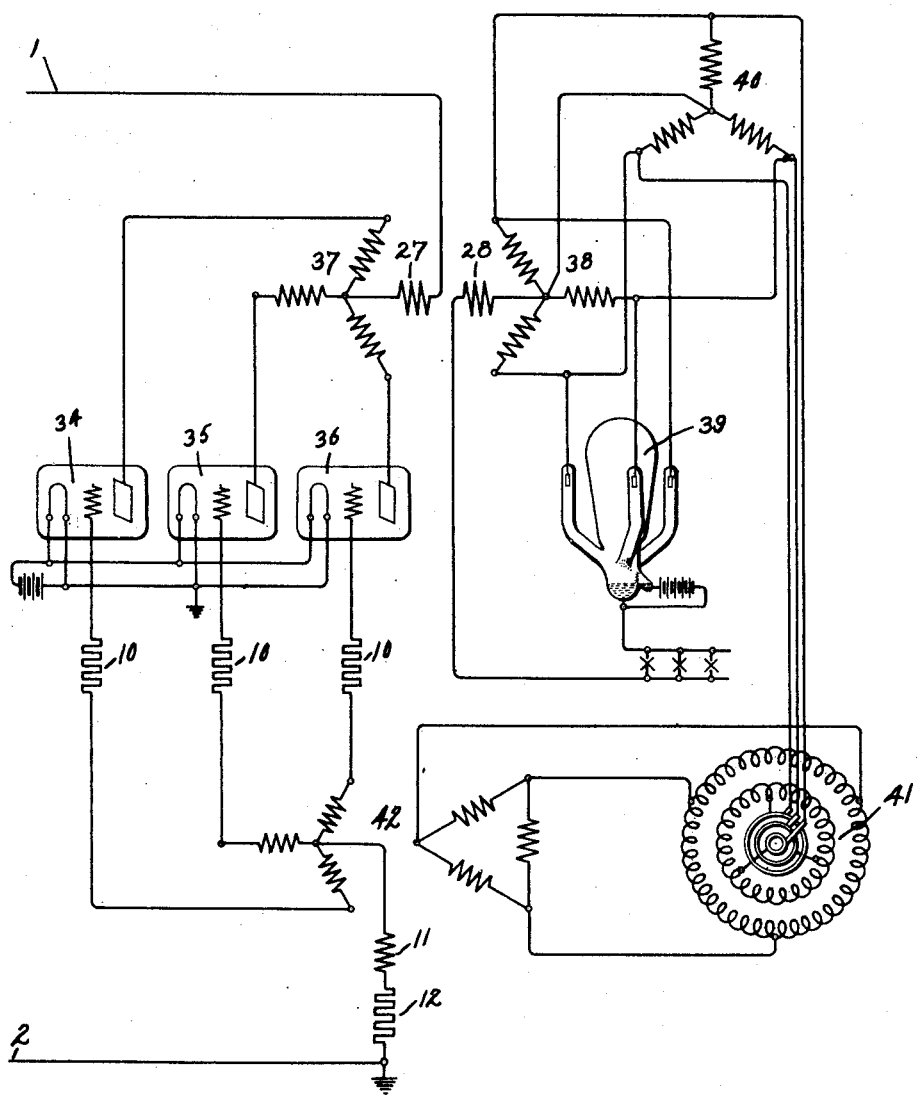

In Fig. 3 I have shown the application of my invention to a three phase system. Here current from the direct current mains 1 and 2 is supplied through the valves 34, 35 and 36 to the primary winding 37 of a Y-connected three phase transformer. The secondary windings 38 of this transformer are connected in Y to the three-phase rectifier 39. The secondary windings 38 also supply current to the windings of a synchronous condenser 40 which establishes the frequency of oscillation or commutation of the direct current supplied to the primary winding. Current for exciting the grids of the valves 34, 35 and 36 is also supplied from the synchronous condenser through a phase shifter 41 for securing the desired angle of lead. The grid circuit connections in this case are made in the same way as in the system of Fig. 1 except that a three-phase transformer 42 is employed in place of the single phase transformer 9.

In explaining the operation of the above described apparatus, it will be assumed that the valve 34 is initially conductive and that current is flowing in this valve. The potential of each of the terminals of the transformer winding 37 at any given instant is equal to the potential of the direct current circuit 1 less the reactance drop in the reactor 27 and the counter-electromotive force induced in the respective windings 37 from the synchronous condenser 40. Consequently the potential of that terminal of the winding 37 is the most positive whose corresponding counter-electromotive force is the least. Assume, for example, that electric valve 35 is made conducting by its control grid at an instant when the counter-electromotive force of the winding connected to this valve is less than that of the winding connected to the valve 34. Under this condition the anode of the valve 35 is positive with respect to the anode of the valve 34 and the two transformer windings connected to these anodes, across which a difference of potential exists, is short circuited through these two valves. This potential difference tends to send a current in a reverse direction through the valve 34 and thus instantly interrupts the current in this valve. If the grid of the valve 34 is so excited as to maintain this valve non-conducting thereafter, the load current will be completely transferred to the valve 35. In a similar manner the load current will be successively transferred between the valves 35 and 36, and 36 and 34, and this cycle will be repeated indefinitely. That is, in brief, the load current is successively forced through each of the windings 37 and its associated electric valve against the counter-electromotive force induced in this winding by the synchronous condenser 40 and the current is transferred from one valve to the other when the second valve is made conductive by its control grid and the counter-electromotive force of its associated transformer winding is less than that of the winding through which the current was previously flowing.

In this system as in that of Figs. 1 and 2, current flows in only one direction through the halves of each of the main transformer windings. It is evident therefore that the transfer of energy from the input to the output side of the system is accomplished by unidirectional currents rather than by alternating currents and that the transformation brought about does not involve the change of direct current to alternating current in the sense in which such transformation is commonly understood.

What I claim as new and desire to secure by Letters Patent of the United States is:

1. The combination of direct and alternating current circuits, electric valve means provided with a pair of anodes arranged to transmit current between said circuits during successive intervals of time and with grids arranged to control the starting of said current, and phase control means connected between said grids and one of said circuits for causing current to be started through one of said anodes before it is interrupted in the other of said anodes.

2. The combination of direct and alternating current circuits, electric valve means provided with a pair of anodes arranged to transmit current between said circuits during successive intervals of time and with grids arranged to control the starting of said current, and phase control means connected between said grids and said alternating current circuit for causing current to be started through one of said anodes before it is interrupted in the other of said anodes.

3. The combination of a direct current circuit, electric valve means provided with a plurality of anodes and with a plurality of grids each arranged to control the starting of current through a different one of said anodes, a transformer provided with a primary winding connected to said direct current circuit through means comprising said anodes and with a secondary winding, and phase control means connected between said grids and said secondary windings for causing current to be started in one of said anodes before it is interrupted in the other of said anodes.

4. The combination of a direct current source, electric valve means provided with a plurality of anodes and with grids each arranged to control the current transmitted through a different one of said anodes, a transformer provided with a plurality of terminals connected to said direct current circuit through the different anodes of said valve means, and phase control means connected to said grids and arranged to cause current to be started through one of said anodes before it is interrupted in the other of said anodes.

5. The combination of a direct current circuit, electric valve means provided with a plurality of anodes and with a plurality of grids each arranged to control the starting of current through a different one of said anodes, a transformer provided with a primary winding connected to said direct current circuit through means comprising said anodes and with a secondary winding, phase control means connected between said grids and said secondary windings for causing current to be started in one of said anodes before it is interrupted in the other of said anodes, and impedance means connected to one of said windings for predetermining the frequency at which power is interchanged between said windings.

6. The combination of direct and alternating current circuits, electric valve means provided with a pair of anodes arranged to transmit current between said circuits during successive intervals of time and with grids arranged to control the starting of said current, and means connected between said grids and one of said circuits for causing current to be started through one of said anodes before it is interrupted in the other of said anodes.

7. The combination of direct and alternating current circuits, electric valve means provided with a pair of anodes arranged to transmit current between said circuits during successive intervals of time and with grids arranged to control the starting of said current, and means comprising a condenser connected between said grids and one of said circuits for causing current to be started through one of said anodes before it is interrupted in the other of said anodes.

8. The method of supplying current to an electric load by means of a unidirectionally conducting gaseous space-current path which consists in, at times, rendering said path conductive by initiating a discharge therethrough, forcing a current through said path against the action of an electromotive force tending to send a reverse current therethrough, and providing another path for said current while said opposing action still persists whereby the current is diverted from said space-current path rendering the same non-conductive.

9. The method of periodically supplying an electric load by means of a unidirectionally conducting space-current path which consists in periodically rendering said path conductive, forcing a current through said path against the action of an electromotive force tending to send a reverse current therethrough, providing another path for said current while said opposing action still persists, whereby the current is diverted from said space-current path, and rendering said space-current path non-conductive while the current is diverted therefrom.

10. The combination with two transformer windings having a common middle tap and two end taps, of a source of direct current having one terminal connected to said middle tap, mercury-arc rectifier means connected between the other terminal of said direct-current source and said end taps, respectively, a condenser means connected across said end taps in series circuit relationship with said rectifier means, and means for alternately interrupting the circuit connections established by the respective mercury-arc rectifiers, said means being so arranged that the circuit interruption in one circuit takes place after the immediately following circuit is established.

11. The combination of a plurality of transformer windings having a common middle tap and a plurality of end taps, respectively, a multi-path mercury-arc rectifier having a plurality of anodes connected to said end taps, respectively, a source of direct current connected between said middle tap and the cathode means of said rectifier, load means for applying to said transformer windings an electromotive force tending to send a reverse current successively through each of said mercury-arc paths, respectively, and means for causing a flow of direct current through said paths, respectively, during the period of application of said electromotive force and for utilizing said electromotive force for successively diverting said current from one of said paths to another.

12. Apparatus for transmitting energy from a direct current circuit to an alternating current circuit comprising a pair of vapor electric paths and a pair of associated inductive windings for interconnecting said circuits, means for successively rendering said paths alternately conductive and non-conductive, and a condenser connected between the circuits of said vapor electric paths for interrupting the current flowing in one path substantially immediately after the other path is made conductive.

13. Apparatus for transmitting energy from a direct current circuit to an alternating current circuit comprising an interconnection for said circuits including an inductive winding provided with an intermediate terminal for connection to one side of said direct current circuit and a pair of vapor electric paths connected between the outer terminals of said winding and a common terminal for connection to the other side of said direct current circuit, means for successively rendering said paths alternately conductive and non-conductive, and a condenser connected between the outer terminals of said winding for interrupting the current in one path substantially immediately after the other path is made conductive.

14. In combination, a direct current circuit, an alternating current circuit, an interconnection for said circuits comprising an inductive winding and a pair of vapor electric paths, one side of said direct current circuit being connected to an intermediate point of said winding and the other side being connected to the outer terminals of said winding through said vapor electric paths, means for successively rendering said paths alternately conductive and non-conductive, and a condenser connected between the outer terminals of said winding for commutating the current between the vapor paths.

15. Apparatus for transmitting energy from a direct current circuit to an alternating current circuit comprising a plurality of impedances, a vapor electric path associated with each impedance for interconnecting said circuits, means for successively rendering said paths alternately conductive and non-conductive, and an untuned static circuit including a condenser associated with the circuits of said vapor electric paths for interrupting the current flowing in one path substantially immediately after the next succeeding path is made conductive.

16. Apparatus for transmitting energy from a direct current circuit to an alternating current circuit comprising a pair of vapor electric paths, each including a continuously excited cathode, and a pair of associated impedances for interconnecting said circuits, means for successively rendering said paths alternately conductive and non-conductive, and an untuned static circuit including a condenser associated with the circuits of said vapor electric paths for interrupting the current flowing in one path substantially immediately after the other path is made conducting.

In witness whereof I have hereunto set my hand this 6th day of July, 1923.

ERNST F. W. ALEXANDERSON.